(12) United States Patent
Chen et al.

(10) Patent No.: US 9,140,916 B2
(45) Date of Patent: Sep. 22, 2015

(54) LCD PANEL AND LCD DEVICE

(71) Applicant: SHENZHEN CHINA STAR OPTOELECTRONICS TECHNOLOGY CO., LTD, Shenzhen (CN)

(72) Inventors: Shihhsiang Chen, Shenzhen (CN); Ruilian Yang, Shenzhen (CN)

( * ) Notice: Subject to any disclaimer, the term of this patent is extended or adjusted under 35 U.S.C. 154(b) by 221 days.

(21) Appl. No.: 13/699,743

(22) PCT Filed: Oct. 25, 2012

(86) PCT No.: PCT/CN2012/083472
§ 371 (c)(1),
(2) Date: Nov. 26, 2012

(87) PCT Pub. No.: WO2014/047997
PCT Pub. Date: Apr. 3, 2014

(65) Prior Publication Data
US 2014/0092357 A1 Apr. 3, 2014

(30) Foreign Application Priority Data
Sep. 29, 2012 (CN) .......................... 2012 1 0375278

(51) Int. Cl.
*G02F 1/1339* (2006.01)
*G02F 1/1333* (2006.01)

(52) U.S. Cl.
CPC ............ *G02F 1/1333* (2013.01); *G02F 1/1339* (2013.01); *G02F 1/13392* (2013.01); *G02F 1/13394* (2013.01)

(58) Field of Classification Search
CPC ............................ G02F 1/1339; G02F 1/1341

USPC .................................................... 349/153, 190
See application file for complete search history.

(56) References Cited

U.S. PATENT DOCUMENTS

| 2006/0221291 A1 | 10/2006 | Hong et al. | |
|---|---|---|---|
| 2008/0291376 A1* | 11/2008 | Chen | 349/106 |
| 2013/0077032 A1* | 3/2013 | Chen et al. | 349/122 |

FOREIGN PATENT DOCUMENTS

| CN | 1380634 A | 11/2002 |
|---|---|---|
| CN | 101089689 A | 12/2007 |
| CN | 101427292 A | 5/2009 |
| CN | 202166809 U | 3/2012 |
| JP | 2006285001 A | 10/2006 |
| JP | 2009015122 A | 1/2009 |

OTHER PUBLICATIONS

Zhou Yu, the International Searching Authority written comments, Jul. 2013, CN.

* cited by examiner

*Primary Examiner* — Phu Vu

(57) ABSTRACT

The present disclosure provides a liquid crystal display (LCD) device and an LCD device. The LCD panel includes a first substrate and a second substrate oppositely arranged to the first substrate, and each of oppositely arranged surfaces of the two substrates are layered with one or more material layers. The edge of the oppositely arranged surface(s) of the first substrate and/or the second substrate is layered with protrusions and/or recesses, the edge layered with the protrusions and/or recesses is bonded with sealant, and the first substrate is bonded and fixed to the second substrate by the sealant.

17 Claims, 3 Drawing Sheets

LCD PANEL AND LCD DEVICE

TECHNICAL FIELD

The present disclosure relates to the field of liquid crystal displays (LCDs), and more particularly to an LCD panel and an LCD device.

BACKGROUND

As a main component of a liquid crystal display (LCD), an LCD panel decides brightness, contrast, color, viewing angle, and display range of the LCD device to a great extent. With the development of LCD technology, people expect width of frames of LCD devices to be narrower.

As shown in FIG. 1, the LCD panel includes a first substrate 210, a second substrate 220, and a sealant 216 arranged at an edge of the first substrate 210 and the second substrate 220. The sealant 216 bonds the first substrate 210 to the second substrate 220 and keeps the first substrate 210 airtight with the second substrate 220. Because there is a bonding relationship between the sealant 216 and the first substrate 210 and the second substrate 220, a wider sealant is used to ensure the bonding between the first substrate and the second substrate, resulting in a larger distance from an edge of an AA area (the active display area of the LCD panel, the bonding area of the sealant 216 is an inactive display area) to an edge of the LCD panel, so that it is difficult to make the frame (the frame is the area from the edge of the AA area to the edge of the LCD panel, namely area of an edge of the glass) narrower.

SUMMARY

In view of the above-described problems, the aim of the present disclosure is to provide a liquid crystal display (LCD) panel and an LCD device with narrower frame and larger active display area.

An aim of the present disclosure is achieved by the following technical scheme. An LCD panel, comprising:

a first substrate and a second substrate oppositely arranged to the first substrate; each of oppositely arranged surfaces of the two substrates is layered with one or more material layers.

An edge of each of the oppositely arranged surfaces of the first substrate and/or the second substrate is layered with protrusions and/or recesses, the edge layered with the protrusions and/or recesses is bonded with a sealant, and the first substrate bonds with the second substrate by the sealant.

The protrusions are formed by stacking one or more material layers at the edge of each of the oppositely arranged surfaces of the two substrates, and the recesses are formed by arranging gaps on the one or more material layers at the edge of each of the oppositely arranged surfaces of the two substrates.

The protrusions are two linear protrusions parallelly arranged at an edge of the first substrate or the second substrate and extend in an extension direction of the sealant, and the linear protrusions are wavily arranged at the edge of the first substrate or the second substrate and are layered with steps.

The aim of the present disclosure is further achieved by the following technical schemes. An LCD panel comprises a first substrate and a second substrate oppositely arranged to the first substrate; each of the oppositely arranged surfaces of the two substrates is layered with one or more material layers. An edge of each of the oppositely arranged surfaces of the first substrate and/or the second substrate is layered with protrusions and/or recesses, the edge layered with the protrusions and/or recesses is bonded with a sealant, and the first substrate bonds with the second substrate by the sealant.

In one example, the protrusions are formed by stacking one or more material layers at the edge of each of the oppositely arranged surfaces of the two substrates, and the recesses are formed by arranging gaps on the one or more material layers at the edge of each of the oppositely arranged surfaces of the two substrates. The protrusions or recesses are directly formed when using process of forming more material layers on the oppositely arranged surfaces of the two substrates which make manufacture become convenient.

In one example, the first substrate or the second substrate is only layered with protrusions, and the protrusions are linear protrusions arranged at an edge of the first substrate or the second substrate and extend in an extension direction of the sealant. Because surface area of the substrate edge increased by the linear protrusions is large, bonding area between the substrate and the sealant is increased, alignment liquid is prevented from diffusing when the second alignment layer is applied on the second substrate, an edge of the alignment layer is kept to be relatively aligned, and then range of the active display area is increased.

In one example, the edge of the first substrate or the second substrate is layered with at least two linear protrusions. The bonding area between the substrate and the sealant is further increased by using a plurality of linear protrusions.

In one example, the linear protrusions are wavily arranged at the edge of the first substrate or the second substrate. The wavy arrangement can increase length of the linear protrusions, and then increase surface area of the protrusions.

In one example, the plurality of linear protrusions are arranged in parallel, a photo spacer is arranged in the sealant, and the photo spacer is arranged between two adjacent linear protrusions. Distance between the two substrates is kept by the photo spacer.

In one example, both the edge of the first substrate and the edge of the second substrate are layered with the linear protrusions. The bonding reliability between the two substrates and the sealant is increased.

In one example, the linear protrusions arranged on the first substrate and the second substrate are mutually staggered in an laminating direction of the two substrates. The protrusions are mutually staggered and are arranged opposite to channels. Thus, bonding effect of the sealant can be increased.

In one example, the protrusions or recesses are layered with steps. The surface area of the protrusions or the recesses is further increased by the steps.

An LCD device comprises the aforementioned LCD panel.

In the present disclosure, because the oppositely arranged surfaces of the two oppositely arranged substrates are layered with protrustions or recesses, the bonding area between the sealant and the first substrate and the second substrate is increased by the protrusions or recesses, thereby increasing the bonding stability of the sealant. In the first respect, if the sealant of the LCD panel is bonded to the edge of the LCD panel by using width of the original sealant, relative fixed stability of the first substrate and the second substrate of the LCD panel can be further increased. In the second respect, the bonding stability is achieved in accordance with the width of the original sealant, and the width of the sealant is reduced to achieve the same or even better bonding stability after arranging the protrusions or recesses. In this respect, because the width of the sealant is reduced, the frame of the LCD panel becomes narrower. Correspondingly, the frame of the LCD device also becomes narrower, and the display range will become wider. In the third respect, because of the protrusions or recesses, when applying Polyamine (PI) onto the first substrate and the second substrate, the protrusions or recesses can prevent the PI from nonuniformly flowing outwards at the edge of the first substrate and the second substrate to cause distance (the distance also belongs to a part of the frame width) between an edge of the active display area and the sealant to be overlarge. Thus, phenomena of undersize range of the active display area and overlarge frame can be avoided, thereby being beneficial to narrower frame design and increasement of active display area.

Legends: 100. TFT; 210. first substrate; 220. second substrate; 211. black matrix layer; 212. color filtering layer; 213. transparent conducting layer; 214. photo spacer; 215. first alignment layer; 216. sealant; 221. protective layer; 222. insulating layer; 223. first metallic layer; 224. semiconductor layer; 225. second metallic layer; 226. transparent conducting layer; 227. second alignment layer; 240. protrusion or linear protrusion; 250. protrusion or linear protrusion; 251. additional material layer; 252. step.

DETAILED DESCRIPTION

The present disclosure will further be described in detail in accordance with the figures and the examples.

Example 1

Figure 1:
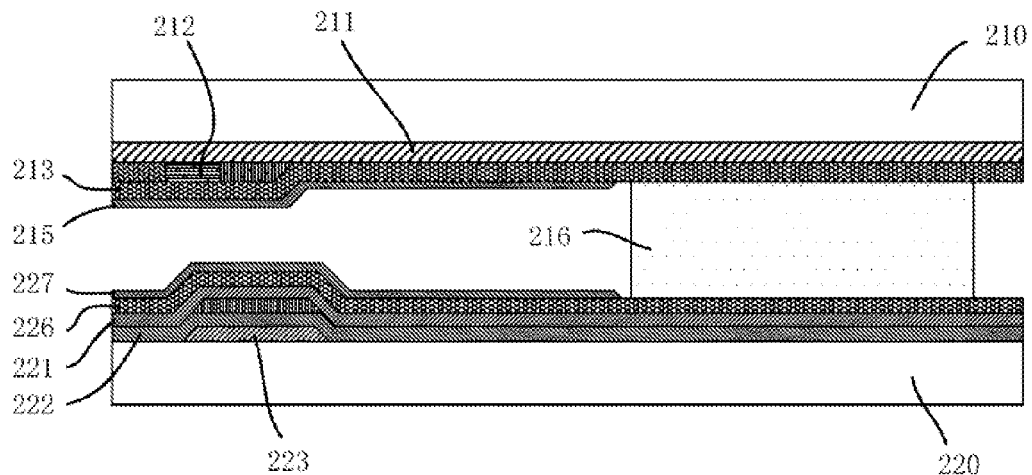
FIG. 1 is a simplified structural diagram of a typical liquid crystal display (LCD) panel in the prior art.
Figure 2:
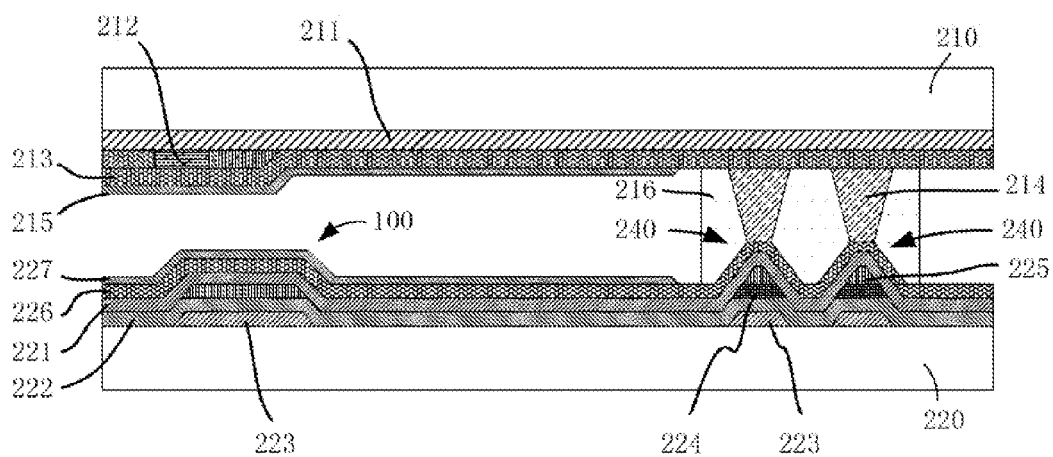
FIG. 2 is a simplified structural diagram of an LCD panel of a first example of the present disclosure.

As shown in FIG. 2, a liquid crystal display (LCD) panel of the present disclosure comprises a first substrate 210, a second substrate 220, and a sealant 216 arranged at an edge of the first substrate 210 and the second substrate 220. The sealant 216 bonds the first substrate 210 to the second substrate 220 and keeps the first substrate 210 airtight with the second substrate 220. Each of oppositely arranged surfaces of the two substrates is layered with a plurality of material layers. A surface of the first substrate 210 opposite to the second substrate 220 is layered with a black matrix layer 211, a color (Red Green Blue (RGB)) filtering layer 212, a transparent conducting layer (Indium Tin Oxide (ITO) or other conducting material) 213, a photo spacer 214, and a first alignment layer (can be made of Polyamine (PI) material) 215 in sequence. A surface of the second substrate 220 opposite to the first substrate 210 is layered with a first metallic layer 223, an insulating layer 222, a semiconductor layer 224, a second metallic layer 225, a protective layer 221, a transparent conducting layer 226, and a second alignment layer 227 in sequence. Covering positions and area of all the material layers on the oppositely arranged surfaces of the first substrate 210 and the second substrates 220 are different. For example, the first metallic layer 223, the insulating layer 222, the semiconductor layer 224, the protective layer 221, and the transparent conducting layer 226 are stacked in accordance with a certain shape in one position of the second substrate 220 by material layer formation process to form a thin film transistor (TFT) 100.

At an edge of the LCD panel, the sealant 216 bonds the first substrate 210 to the second substrate 220 and keeps the first substrate 210 airtight with the second substrate 220. Bonding position of the sealant 216 is layered with protrusions 240 formed by stacking a plurality of material layers in formation process. The plurality of material layers include the first metallic layer 223, the insulating layer 222, the semiconductor layer 224, the second metallic layer 225, the protective layer 221, and the transparent conducting layer 226. Surface area at the edge of the second substrate 220 is increased by an upward convex surface of the protrusions 240, namely when the sealant 216 bonds, the sealant 216 is partially bonded to the surface of the protrusions 240, and bonding area between the sealant 216 and the second substrate 220 is increased. Thus, bonding stability between the sealant 216 and the second substrate 220 is increased. A main aim of the example is to make the frame of the LCD panel narrower. Because the first substrate 210 and the second substrate 220 are bonded to each other and kept stable in accordance with width of the original sealant, and the original bonding area is kept by reducing width of the sealant 216 after the bonding position of the sealant is layered with the protrusions 240. The width of the sealant 216 used in the example is narrower than the width of the original sealant, namely range of the active display area is increased by reducing the width of the sealant 216, and then distance between the active display area and the edge of the LCD panel is made to be smaller, namely width of the frame becomes narrower.

Figure 3:
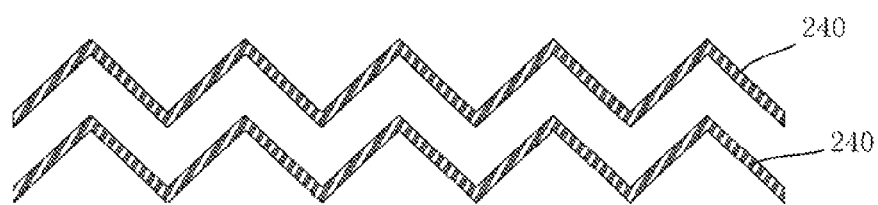
FIG. 3 is a simplified structural diagram of linear protrusions of a second substrate of a first example of the present disclosure.

As shown in FIG. 3, the protrusions 240 extend along the edge of the second substrate 220 to form linear protrusions. The linear protrusions can keep all the bonding area between the sealant 216 in each position and the substrate the same, and the linear protrusions 240 can prevent alignment liquid from diffusing at the edge of the second substrate 220 when the second alignment layer 227 is applied on the second substrate 220 because the linear protrusions 240 are arranged at the edge of the second substrate 220. Thus, the edge of the second alignment layer 227 formed is relatively regular, so that the active display area, namely an edge of the active alignment layer 227 is closer to the sealant 216. Thus, the range of the active display area is further increased, and the width of the frame becomes narrower. In addition, as shown in the FIG. 3, the linear protrusions 240 are wavily arranged in the edge of second substrate 220. An aim is to make length of the linear protrusions 240 to be longer. Because the length of the linear protrusions 240 decides surface area of the linear protrusions 240, a longer length of the linear protrusions 240 makes the bonding area between the linear protrusions 240 and the sealant 216 be larger, and the bonding reliability be higher. Meanwhile, a larger bonding area can be obtained by arranging two or more than two linear protrusions. Two linear protrusions 240 which are wavily arranged and mutually arranged in parallel are arranged in the example.

As shown in FIG. 2, to ensure distance between the first substrate 210 and the second substrate 220, the first substrate 210 is further layered with a photo spacer 214, one end of the photo spacer 214 is arranged on the first substrate 210, and another end of the photo spacer 214 is butted on top of the protrusion 240, thereby ensuring an effective bonding volume of the sealant 216. Because the first substrate 210 itself is layered with the photo spacer 214, the bonding area between the first substrate 210 and the sealant 216 can be increased. Thus, no protrusion is additionally arranged. However, because the photo spacer is of a discontinuous dot structure, the photo spacer may not provide better bonding area.

Optionally, the protrusions 240 are not limited to the linear protrusions of the example, and the protrusions 240 can be a plurality of dot-shaped protrusions, discontinuous linear protrusions or continuous protrusions arranged in a non-wavy and non-parallel mode as well. No matter if the protrusions are of the dot structure or protrusions of other structures, the protrusions prevent the alignment liquid from diffusing, but effect of the protrusions may be worse than effect of the linear protrusions.

Example 2

Figure 4:
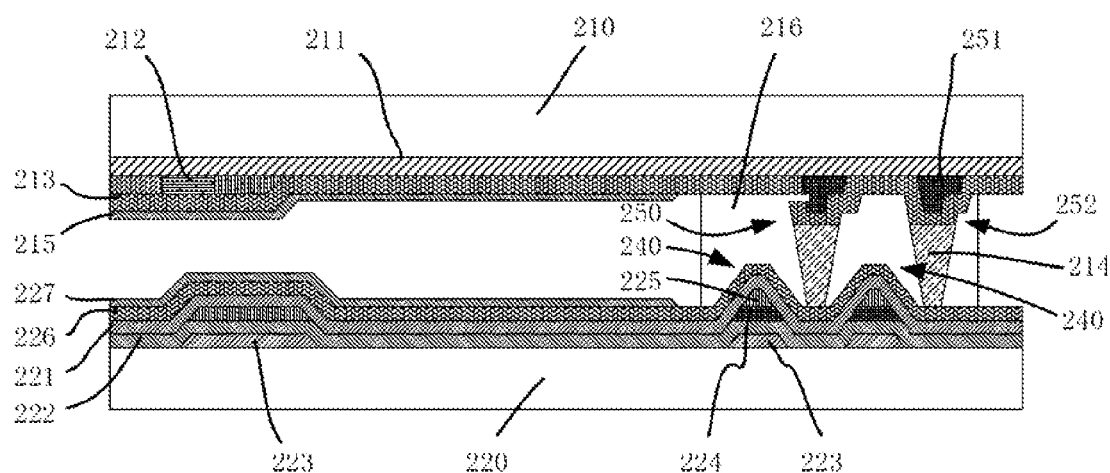
FIG. 4 is a simplified structural diagram of an LCD panel of a second example of the present disclosure.

As shown in FIG. 4 the second example is different from the first example in that: the first substrate 210 is further layered with two linear protrusions 250, and each of the linear protrusions 250 is also formed by stacking a plurality of material layers. Additional material layer 251 shown in the FIG. 4 the additional material layer 251 is added when the material layer of the first substrate 210 is formed or when the color filtering layer 212 is formed.

Figure 5:
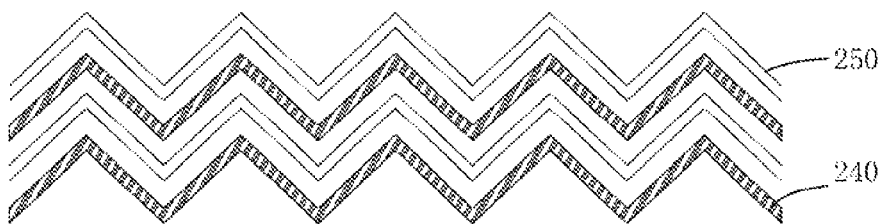
FIG. 5 is a first arrangement diagram of linear protrusions of the two substrates in a laminating direction of an LCD panel of a second example of the present disclosure.

A channel is formed between the two linear protrusions 240 which are arranged in parallel on the first substrate 210. Similarly, a channel is formed between the two linear protrusions 250 which are arranged in parallel on the second substrate 220. Moreover, as shown in FIG. 5, in a laminating direction of the two substrates, the linear protrusions 250 arranged on the first substrate 210 and the linear protrusions 240 arranged on the second substrate 220 are mutually staggered and directly face the channel between the two linear protrusions 240 arranged on the second substrate 220, and the photo spacer 214 is arranged on the linear protrusions 250 arranged on the first substrate 210 and is positioned in the channel between the two adjacent linear protrusions 240. Thus, the bonding effect between the sealant 216 and the two substrates can be increased. The protrusions 250 are layered with steps 252, to increase the surface area of the protrusions 250.

Figure 6:
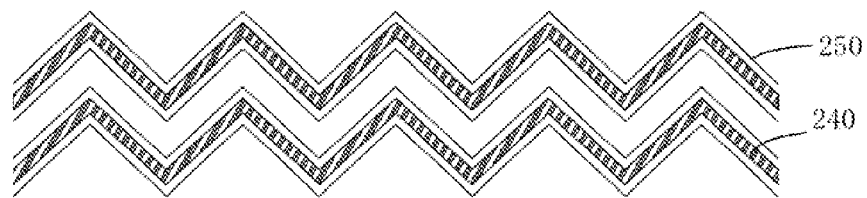
FIG. 6 is a second arrangement diagram of linear protrusions of the two substrates in a laminating direction of an LCD panel of a second example of the present disclosure.
Figure 7:
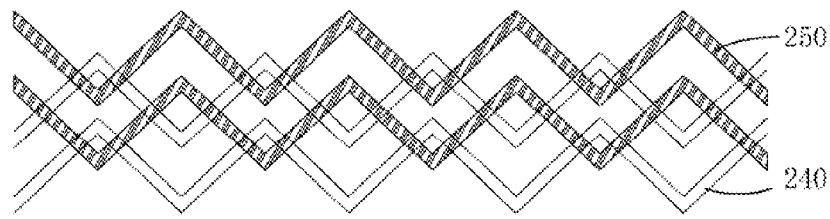
FIG. 7 is a third arrangement diagram of linear protrusions of the two substrates in a laminating direction of an LCD panel of a second example of the present disclosure.

Optionally, arrangement mode of the linear protrusions on the two substrates is not limited to staggered mode. As shown in FIG. 6, the arrangement mode of the linear protrusions may be an overlapping mode; as shown in FIG. 7, the arrangement mode of the linear protrusions may be in an intersecting mode.

Example 3

Figure 8:
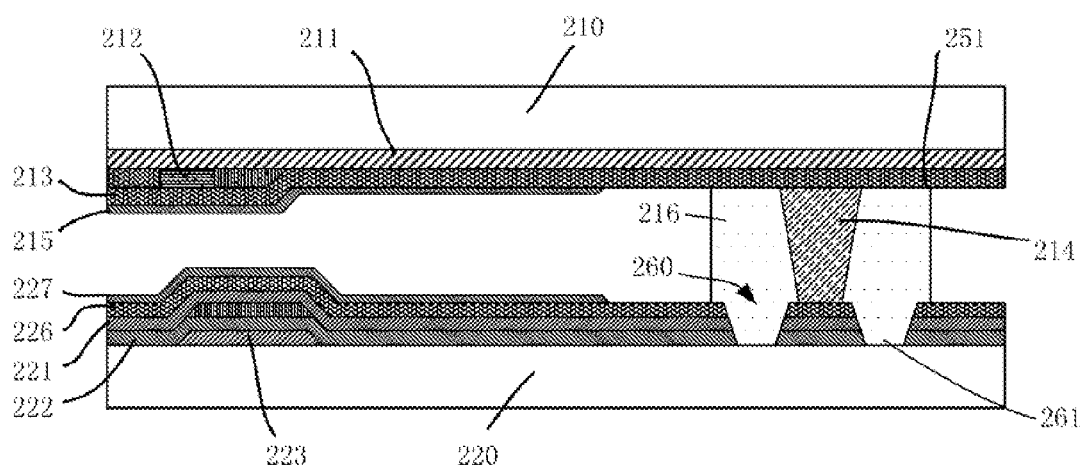
FIG. 8 is a simplified structural diagram of an LCD panel of a third example of the present disclosure.

As shown in FIG. 8, a third example is different from the first example and the second example in that the edge of the second substrate 220 is layered with a recesses 260 instead of a protrusion. Similarly, the recesses 260 can add to the surface area of the edge, and then can adjust a contact area between the sealant 216 and the second substrate 220. The recesses 260 are formed by arranging gaps 261 on the insulating layer 222, the protective layer 221 and the transparent conducting layer 226 at the edge of the second substrate 220. Optionally, the gaps can be only arranged on the uppermost transparent conducting layer 226 as well.

In the second example, the protrusion 250 is layered with step 251 in order to increase the surface area. For the third example, the recess 260 can be layered with step as well in order to increase the surface area. Principles are the same.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, for example, the schemes that the protrusions are arranged on the first substrate 210 and the recesses are arranged on the second substrate 220, the recesses are arranged on both the first substrate 210 and the second substrate 220, the protrusions are not linear, or the protrusions are linear but are not arranged in parallel may be obtained by deductions or replacements, and all of which should be considered to belong to the protection scope of the present disclosure.

The invention claimed is:

1. A liquid crystal display (LCD) panel, comprising:
a first substrate; and
a second substrate oppositely arranged to the first substrate, wherein each of oppositely arranged surfaces of the two substrates is layered with one or more material layers,
wherein an edge of each of the oppositely arranged surfaces of the first substrate and/or the second substrate is layered with protrusions and/or recesses, the edge layered with the protrusions and/or recesses is bonded with a sealant, and the first substrate bonds with the second substrate by the sealant, wherein the protrusions or recesses are layered with steps.

2. The liquid crystal display (LCD) panel of claim 1, wherein the protrusions are formed by stacking one or more material layers at the edge of each of the oppositely arranged surfaces of the two substrates, and the recesses are formed by arranging gaps on the one or more material layers at the edge of each of the oppositely arranged surfaces of the two substrates.

3. The liquid crystal display (LCD) panel of claim 1, wherein the first substrate or the second substrate is only layered with protrusions, and the protrusions are linear protrusions arranged at an edge of the first substrate or the second substrate and extend in an extension direction of the sealant.

4. The liquid crystal display (LCD) panel of claim 3, wherein the edge of the first substrate or the second substrate is layered with at least two linear protrusions.

5. The liquid crystal display (LCD) panel of claim 4, wherein the linear protrusions are wavily arranged at the edge of the first substrate or the second substrate.

6. The liquid crystal display (LCD) panel of claim 4, wherein the plurality of linear protrusions are arranged in parallel, a photo spacer is arranged in the sealant, and the photo spacer is arranged between two adjacent linear protrusions.

7. The liquid crystal display (LCD) panel of claim 6, wherein both the edge of the first substrate and the edge of the second substrate are layered with the linear protrusions.

8. The liquid crystal display (LCD) panel of claim 7, wherein the linear protrusions arranged on the first substrate and the second substrate are mutually staggered in a laminating direction of the two substrates.

9. A liquid crystal display (LCD) device, comprising: an LCD panel, wherein the LCD panel comprises:
a first substrate; and
a second substrate oppositely arranged to the first substrate, wherein each of oppositely arranged surfaces of the two substrates is layered with one or more material layers;

wherein an edge of each of the oppositely arranged surfaces of the first substrate and/or the second substrate is layered with protrusions and/or recesses, the edge layered with the protrusions and/or recesses is bonded with a sealant, and the first substrate bonds with the second substrate by the sealant.

10. The liquid crystal display (LCD) device of claim 9, wherein the protrusions are formed by stacking one or more material layers at the edge of each of the oppositely arranged surfaces of the two substrates, and the recesses are formed by arranging gaps on the one or more material layers at the edge of each of the oppositely arranged surfaces of the two substrates.

11. The liquid crystal display (LCD) device of claim 10, wherein the first substrate or the second substrate is only layered with protrusions, and the protrusions are linear protrusions arranged at an edge of the first substrate or the second substrate and extend in an extension direction of the sealant.

12. The liquid crystal display (LCD) device of claim 11, wherein the edge of the first substrate or the second substrate is layered with at least two linear protrusions.

13. The liquid crystal display (LCD) device of claim 12, wherein the linear protrusions are wavily arranged at the edge of the first substrate or the second substrate.

14. The liquid crystal display (LCD) device of claim 12, wherein the plurality of linear protrusions are arranged in parallel, a photo spacer is arranged in the sealant, and the photo spacer is arranged between two adjacent linear protrusions.

15. The liquid crystal display (LCD) device of claim 12, wherein both the edge of the first substrate and the edge of the second substrate are layered with the linear protrusions.

16. The liquid crystal display (LCD) device of claim 15, wherein the linear protrusions arranged on the first substrate and the second substrate are mutually staggered in the laminating direction of the two substrates.

17. The liquid crystal display (LCD) device of claim 9, wherein the protrusions or recesses are layered with steps.

* * * * *